United States Patent

[11] 3,570,591

| | | |
|---|---|---|
| [72] | Inventor | Donald L. Swords<br>Mt. Prospect, Ill. |
| [21] | Appl. No. | 857,140 |
| [22] | Filed | Sept. 11, 1969 |
| [45] | Patented | Mar. 16, 1971 |
| [73] | Assignee | Honeywell Inc.<br>Minneapolis, Minn. |

[54] PNEUMATIC CONTROL SYSTEM
5 Claims, 2 Drawing Figs.

[52] U.S. Cl. .................................... 165/39, 137/81.5
[51] Int. Cl. .................................... F15c 1/14, G05d 23/08
[50] Field of Search .................................... 137/81.5, (Inquired); 165/32, 39

[56] References Cited
UNITED STATES PATENTS

| | | | | |
|---|---|---|---|---|
| 3,279,531 | 10/1966 | Bowles | ...................... | 137/81.5X |
| 3,426,782 | 2/1969 | Thorburn | ...................... | 137/81.5 |
| 3,445,317 | 5/1969 | Marshall et al. | ............... | 165/39 |

*Primary Examiner*—William R. Cline
*Attorneys*—Lamont B. Koontz and Francis A. Sirr ABSTRACT: A pneumatic control system including an air motion responsive device including a fluidic amplifier for improving the response of said device wherein the amplifier is powered by the branch line pressure of a condition responsive device of said system supplied through a pressure reducing valve.

Patented March 16, 1971

3,570,591

INVENTOR.
DONALD L. SWORDS
BY
ATTORNEY.

PNEUMATIC CONTROL SYSTEM

This invention relates to a pneumatic condition control system including means responsive to air movement wherein said means includes a fluidic amplifier powered by branch line pressure.

Earlier systems have incorporated an air motion relay to control operation of a temperature control system, for instance, in accordance with air movement but these systems have been handicapped by the relatively large air motion sensing means required. By use of a fluidic amplifier, the air motion sensing means can be reduced in size but additional piping is then required to power the amplifier. By the present invention, the additional piping mentioned is eliminated by supplying branch line pressure through a pressure reducing valve to power the amplifier.

Figure 1:
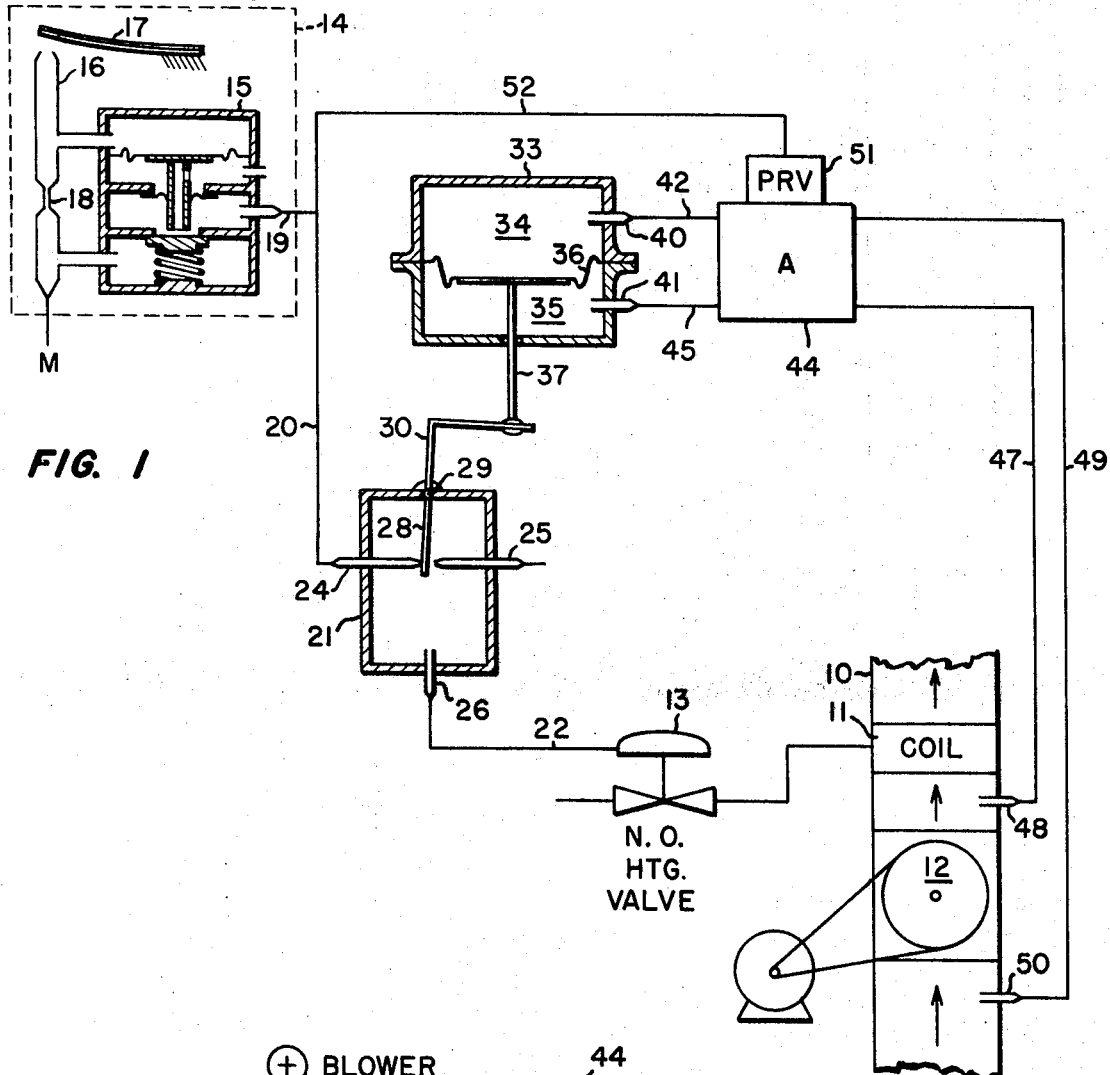

FIG. 1 of the drawings schematically shows the system of the present invention.

Figure 2:
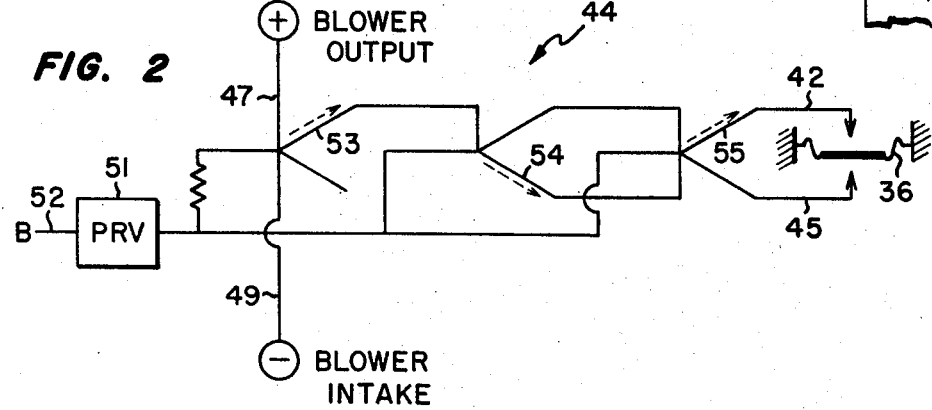

FIG. 2 schematically shows the configuration of a fluidic amplifier such as used in the apparatus of FIG. 1.

In the schematic showing of FIG. 1, air conditioning apparatus 10 includes a coil or similar condition changing device 11 and a blower 12 for circulating a transfer medium such as air through the coil and into the conditioned space. Blower 12 is operated by a suitable motor turned on or off by means not shown. The coil 11 is furnished condition changing fluid through a normally open valve 13 controlled by a pilot-bleed type thermostat 14. Pilot-bleed type thermostat 14 includes a relay 15, nozzle 16, and a bimetal 17 is arranged to control the passage of air from nozzle 16. Nozzle 16 is supplied by air from a main through restriction 18 and the resulting nozzle pressure is connected to control relay 15 the output of which provides the control or branch pressure of the thermostat to pipe 19, pipe 20, pneumatic switch 21 and pipe 22 to the aforementioned valve 13. The pressure in branch line or pipe 19 generally varies between about 3 to 13 pounds per square inch. Pneumatic switch 21 includes nozzle 24 connected to pipe 20 and further includes a nozzle 25 exhausting to the atmosphere. A common passage 26 is connected to pipe 22 leading to valve 13. Nozzles 24 and 25 are controlled by flapper 28 pivoted at 29 with flapper 28 being suitably sealed by a flexible sealing means not shown. Flapper 28 is operated by crank or lever means 30 connected to pressure sensing means 33 comprising upper and lower chambers 34 and 35 respectively. Chambers 34 and 35 are divided by a flexible diaphragm 36 connected through a member 37 to crank 30. At the point where member 37 extends through the bottom of chamber 35, a suitable seal is provided that has sufficient flexibility to permit the necessary operative movements of member 37 and diaphragm 36. Chamber 34 is supplied with fluid pressure through inlet 40 and chamber 35 is provided with an inlet 41. Inlet 40 is connected to pipe 42 which in turn connects to an outlet of fluidic amplifier 44 and inlet 41 of device 33 is connected by pipe 45 to another outlet of said amplifier. One inlet port of amplifier 44 is connected by piping 47 to a nozzle 48 arranged in the outlet of blower 12 in such a manner as to respond to the outlet or discharge pressure from the blower. The other inlet connection of amplifier 44 is connected by piping 49 to nozzle 50 arranged at the inlet of blower 12 and thus responds to the inlet pressure of the blower. Fluidic amplifier 44 is also connected, through pressure reducing valve 51, to branch line 19 by piping 52, the air supplied by piping 52 providing the energy or pressure supply of amplifier 44.

The fluidic amplifier shown in FIG. 2 is a commercially available device involving three stages of amplification; the unit, in practice, is unitary and formed of glass. However, the piping connections are shown on this schematic to indicate the connections that compare to those described in FIG. 1. Thus, the power air supplied through piping 52 is at the left of this FIG. and is fed through pressure reducing valve 51 at a pressure somewhat under 1 pound per square inch. Device 33, generally integral with switch 21, is operable by pressure differences much less than said 1 pound but may not be operable by the unamplified pressure difference of the blower 12. The air supply is then fed to the inlet of each of the three stages of amplification of the fluidic amplifier 44 with the flow to the first stage being somewhat restricted. Further, due to the internal construction of the amplifier, a normal bias is provided in the direction shown by the dotted arrows 53, 54, and 55 with the result that when air is supplied to amplifier 44, and with no pressure being supplied through 47 or 49, the pressure of the upper side of diaphragm 36 is greater than that on the bottom side and thus causes operation of flapper 28 in a direction to close nozzle 24 and to open nozzle 25.

OPERATION

As shown in FIG. 1, the blower 12 is assumed to be stopped. Now, assuming that main air is supplied to thermostat 14 and blower 12 is started, the pressure in nozzle 48 and pipe 47 tends to increase relative to the pressure in nozzle 50 and piping 49. This increase in differential pressure between the connections 47 and 49 operates to provide an output in fluid amplifier 44 and thus provides an increase in pressure in pipe 45 and chamber 35 and a diminished pressure in chamber 34 through pipe 42. The result is that diaphragm 36 is moved upwardly from the position shown and flapper 28 moves away from nozzle 24 and closes nozzle 25. This permits thermostat 14 to control valve 13 through pipes 19, 20, switch 21 and pipe 22. Thus, the system is fully operative and the control effected on valve 13 is precisely the same as though thermostat 14 were directly connected to it. This normal operation continues so long as blower 12 functions but when blower 12 is stopped, the aforementioned differential pressure diminishes to zero and diaphragm 36 is again moved toward its lower position by the aforementioned fluid bias provided by amplifier 44, or by any other bias, with the result that passage 25 is open to the atmosphere and bleeds air from valve 13 permitting it to fully open.

It is thus seen that normal control operations are provided herein and yet the only piping needed to effect this control is the single branch line 19 running from the thermostat to the mechanism located at the air conditioning apparatus since no main supply is required for fluid amplifier 44.

I claim:
1. An air conditioning apparatus, comprising:
pneumatic means responsive to a condition to be controlled and providing a branch pressure indicative of said condition;
means for changing said condition including means for circulating a condition changing transfer medium;
said condition changing means also including means for changing the condition of said transfer medium;
a control device for controlling the means for changing the condition of said transfer medium;
means connecting said condition responsive means in controlling relation to said control device;
said connecting means including a pneumatic switch;
pressure operated means for actuating said switch;
fluid amplifier means having a fluid supply connection, input means and output means;
a pressure reducing valve means having an inlet and an outlet;
means connecting the output means of said amplifier means in operative relation to said pressure operated means;
means providing pressure to the input means of said amplifier indicative of circulation of said condition changing transfer medium; and
means connecting the branch pressure of said condition responsive means to the inlet of said pressure reducing valve and connecting the outlet of said pressure reducing valve to the fluid supply connection of said fluid amplifier means.

2. The apparatus of claim 1 wherein the control device is pneumatically operated and the pneumatic switch controls the application of branch pressure to said device.

3. The apparatus of claim 1 wherein the pressure operated means for operating the pneumatic switch is biased to move the switch to interrupt the connection between the condition responsive means and the control device when there is no indication of circulation of the condition changing medium.

4. The apparatus of claim 2 wherein the fluid amplifier means is constructed to provide a pressure bias in a direction to operate the switch operating means in a direction to interrupt the connection between the responsive means and the device when there is no pressure indicative of condition changing medium flow.

5. The apparatus of claim 1 wherein the pressure reducing valve provides an outlet pressure below the minimum branch pressure normally provided by said condition responsive means.